(12) United States Patent
Shao

(10) Patent No.: US 12,393,186 B2
(45) Date of Patent: Aug. 19, 2025

(54) METHODS AND SYSTEMS FOR DETERMINING DEVICE ANOMALY BASED ON INDUSTRIAL INTERNET OF THINGS

(71) Applicant: CHENGDU QINCHUAN IOT TECHNOLOGY CO., LTD., Sichuan (CN)

(72) Inventor: Hanshu Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/805,719

(22) Filed: Aug. 15, 2024

(65) Prior Publication Data

US 2024/0402698 A1 Dec. 5, 2024

(30) Foreign Application Priority Data

Jul. 29, 2024 (CN) .......................... 202411017658.3

(51) Int. Cl.
*G05B 23/02* (2006.01)

(52) U.S. Cl.
CPC ..... *G05B 23/0272* (2013.01); *G05B 23/0221* (2013.01); *G05B 23/0235* (2013.01)

(58) Field of Classification Search
CPC ............ G05B 23/0221; G05B 23/0235; G05B 23/0272; Y02P 90/02
USPC ....................................................... 702/183
See application file for complete search history.

(56) References Cited

U.S. PATENT DOCUMENTS

| 11,994,844 B2 * | 5/2024 | Shao ................. G05B 19/4185 |
| 2021/0034383 A1 | 2/2021 | Dong et al. |
| 2022/0159021 A1 * | 5/2022 | Kwon ................. H04L 63/1425 |

FOREIGN PATENT DOCUMENTS

| CN | 110807905 A | 2/2020 |
| CN | 114612262 A | 6/2022 |
| CN | 116562509 A | 8/2023 |
| CN | 116776942 A | 9/2023 |

OTHER PUBLICATIONS

Notification to Grant Patent Right for Invention in Chinese Application No. 202411017658.3 mailed on Sep. 20, 2024, 4 pages.

(Continued)

*Primary Examiner* — John H Le
(74) *Attorney, Agent, or Firm* — Porus IP LLC

(57) ABSTRACT

A method and a system for determining a device anomaly based on an industrial Internet of things (IoT). The method includes: generating a data collection instruction based on a preset sampling rate; obtaining, based on the data collection instruction, operation data of at least one target device; determining a data anomaly degree for the at least one target device based on the operation data; in response to determining that the data anomaly degree satisfies a preset condition, determining an abnormal device based on the data source identification of the operation data; generating an anomaly warning instruction based on the abnormal device and the data anomaly degree corresponding to the abnormal device; based on the data anomaly degree, generating and sending a sampling adjustment instruction; and based on the data anomaly degree, generating and sending a storage adjustment instruction.

11 Claims, 5 Drawing Sheets

(56) References Cited

OTHER PUBLICATIONS

First Office Action in Chinese Application No. 202411017658.3 mailed on Aug. 28, 2024, 10 pages.
3GPP, c1-123e_crdetails, www.3gpp.prg, 2020, 54 pages.
Lou, Xin, Research on space formatting of modern logistics warehousing management, China Excellent Papers Full Text Database, 2011, 58 pages.

* cited by examiner

400

```
┌─────────────────────────────────────────────────────────────┐
│ Obtaining historical operation data of the at least one     │      410
│ target device, and performing a third preprocessing on the  │ ~
│ historical operation data to obtain third processed data    │
└─────────────────────────────────────────────────────────────┘
                              │
                              ▼
┌─────────────────────────────────────────────────────────────┐
│  Determining a data feature of the third processed data     │      420
│           based on the third processed data                 │ ~
└─────────────────────────────────────────────────────────────┘
                              │
                              ▼
┌─────────────────────────────────────────────────────────────┐
│  Determining an anomaly threshold range based on the data   │      430
│           feature of the third processed data               │ ~
└─────────────────────────────────────────────────────────────┘
                              │
                              ▼
┌─────────────────────────────────────────────────────────────┐
│  Determining a data anomaly degree based on the operation   │      440
│         data and the anomaly threshold range                │ ~
└─────────────────────────────────────────────────────────────┘
```

FIG. 4

METHODS AND SYSTEMS FOR DETERMINING DEVICE ANOMALY BASED ON INDUSTRIAL INTERNET OF THINGS

CROSS-REFERENCE TO RELATED APPLICATION

This application claims priority to Chinese application No. 202411017658.3 filed on Jul. 29, 2024, the entire contents of which is incorporated herein by reference.

TECHNICAL FIELD

The present disclosure relates to the field of device diagnosis, and in particular relates to a method and a system for determining a device anomaly based on an industrial Internet of Things.

BACKGROUND

In the context of a rapid development of intelligent manufacturing, an industrial production has a higher requirement on efficiency and reliability of device operation. With the rise of industrial internet of Things (IoT) technology, a condition monitoring and a failure diagnosis of a device are gradually transforming from a traditional manual checking to intelligence and automation. However, a traditional method of device monitoring suffers from problems such as an incomplete data collection, an inefficiency of failure diagnosis, and a long response time, which make it difficult to satisfy needs of modern industrial production.

Therefore, it is necessary to provide a method and a system for determining a device anomaly based on the industrial IoT to realize a real-time monitoring of the state of industrial device, and to achieve a quick and accurate diagnosis, and an early warning of the failures in the industrial device. Thus, an operation efficiency and reliability of the device are improved, a production cost is reduced, and safety and continuity of the industrial production is ensured.

SUMMARY

One or more embodiments of the present disclosure provide a method for determining an anomaly of a device based on the industrial Internet of Things (IoT). The method is performed by a device management platform of a system for determining a device anomaly based on the industrial IoT. The device management platform includes a device management sub-platform and a management data center. The method includes: generating a data collection instruction based on a preset sampling rate through the device management sub-platform and sending the data collection instruction to the management data center; obtaining, based on the data collection instruction, operation data of at least one target device from a sensor general database in a device sensor network platform through the management data center, and partitioning and storing the operation data based on a data source identification, the operation data being obtained by the device sensor network platform through a device perceptual control platform; determining a data anomaly degree for the at least one target device based on the operation data; in response to determining that the data anomaly degree satisfies a preset condition, determining an abnormal device based on the data source identification of the operation data; generating an anomaly warning instruction based on the abnormal device and the data anomaly degree corresponding to the abnormal device, and sending the anomaly warning instruction to a user platform through a service platform; generating a sampling adjustment instruction based on the data anomaly degree and sending the sampling adjustment instruction to the device sensor network platform to adjust the preset sampling rate at which the device sensor network platform obtains the operation data of the abnormal device through the device perceptual control platform; and generating a storage adjustment instruction based on the data anomaly degree and sending the storage adjustment instruction to the management data center to adjust a size of a storage partition corresponding to the abnormal device in the management data center.

One or more embodiments of the present disclosure provide a system for determining a device anomaly based on an industrial Internet of things (IoT), the system includes a user platform, a service platform, a device management platform, a device sensor network platform, and a device perceptual control platform, the device management platform includes a device management sub-platform and a management data center, the device management platform is configured to: generate a data collection instruction based on a preset sampling rate through the device management sub-platform and send the data collection instruction to the management data center; obtain, based on the data collection instruction, operation data of at least one target device from a sensor general database in a device sensor network platform through the management data center, and partition and store the operation data based on a data source identification, the operation data being obtained by the device sensor network platform through a device perceptual control platform; determine a data anomaly degree for the at least one target device based on the operation data; in response to determining that the data anomaly degree satisfies a preset condition, determine an abnormal device based on the data source identification of the operation data; generate an anomaly warning instruction based on the abnormal device and the data anomaly degree corresponding to the abnormal device, and send the anomaly warning instruction to a user platform through a service platform; generate a sampling adjustment instruction based on the data anomaly degree and send the sampling adjustment instruction to the device sensor network platform to adjust the preset sampling rate at which the device sensor network platform obtains the operation data of the abnormal device through the device perceptual control platform; and generate a storage adjustment instruction based on the data anomaly degree and send the storage adjustment instruction to the management data center to adjust a size of a storage partition corresponding to the abnormal device in the management data center.

One or more embodiments of the present disclosure provide a non-transitory computer-readable storage medium, the storage medium storing computer instructions, and when the computer reads the computer instructions in the storage medium, the computer executes a method for determining a device anomaly based on an industrial Internet of things (IoT) as described in the above embodiments.

BRIEF DESCRIPTION OF THE DRAWINGS

The present disclosure is further described in terms of exemplary embodiments. These exemplary embodiments are described in detail with reference to the drawings. These drawings are not limiting. In these embodiments, similar reference numerals indicate similar structures throughout the several views of the drawings, and wherein:

FIG. 4 is a flow chart illustrating an exemplary process for determining a data anomaly degree according to some embodiments of the present disclosure.

DETAILED DESCRIPTION

Figure 1:
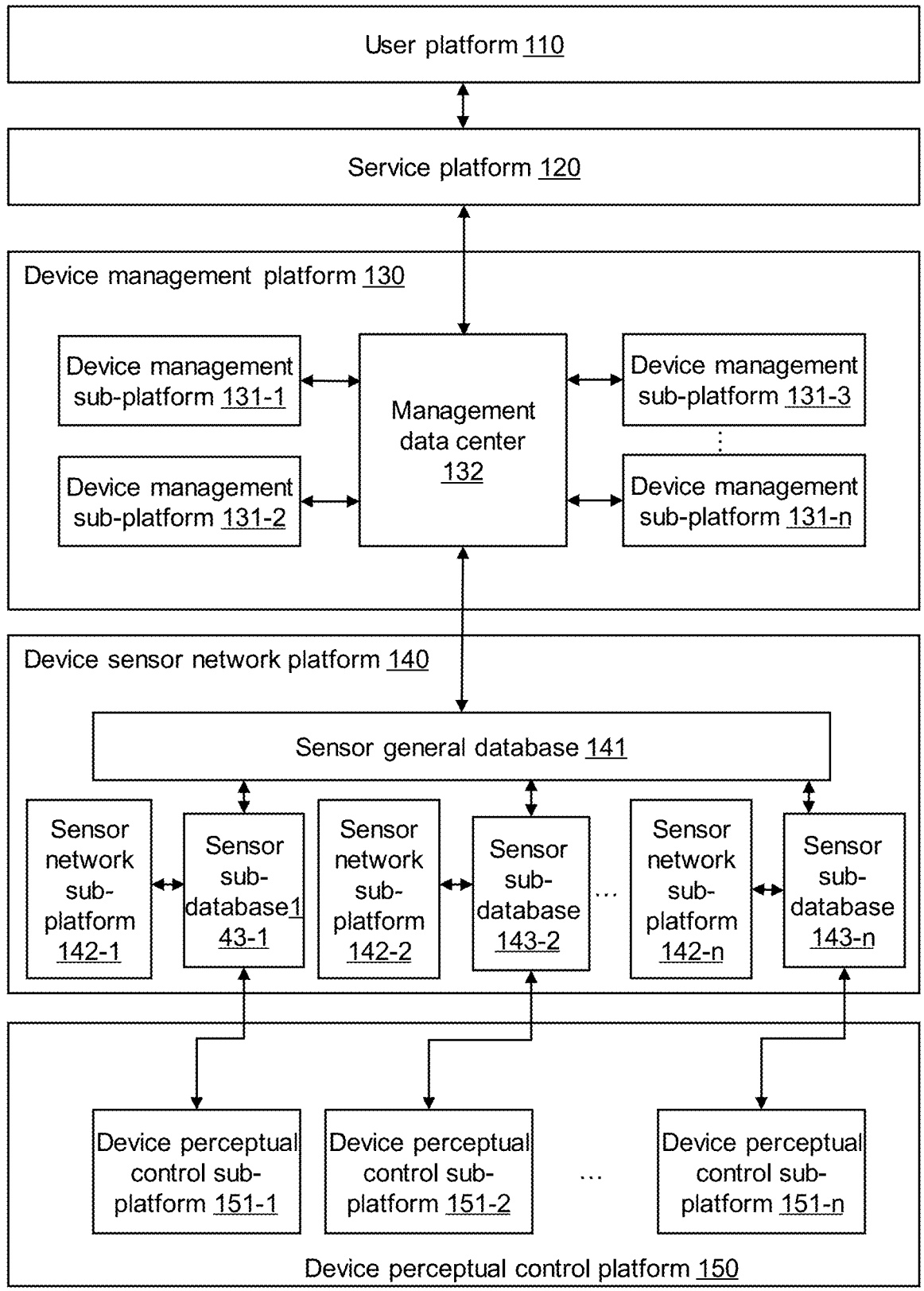
FIG. 1 is a diagram illustrating a platform structure of a system for determining a device anomaly based on an industrial Internet of things (IoT) according to some embodiments of the present disclosure.

To more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for those skilled in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system," "device," "unit" and/or "module" as used herein are a way to distinguish between different components, elements, parts, sections, or assemblies at different levels. However, if other words accomplish the same purpose, the words may be replaced by other expressions.

As shown in the present disclosure and in the claims, unless the context clearly suggests an exception, the words "one," "a," "an," and/or "the" do not refer specifically to the singular, but may also include the plural. Generally, the terms "including" and "comprising" suggest only the inclusion of clearly identified steps and elements that do not constitute an exclusive list, and the method or device may also include other steps or elements.

When describing the operations performed in the embodiments of the present disclosure in terms of steps, the order of the steps is all interchangeable if not otherwise indicated, the steps can be omitted, and other steps can be included in the operation.

FIG. 1 is a diagram illustrating a platform structure of a system for determining a device anomaly based on an industrial Internet of things (IoT) according to some embodiments of the present disclosure.

As shown in FIG. 1, a system for determining a device anomaly based on an industrial Internet of things IoT 100 (hereinafter referred to as a system for determining a device anomaly 100) based on the industrial IoT may include a user platform 110, a service platform 120, a device management platform 130, a device sensor network platform 140, and a device perceptual control platform 150.

The user platform 110 refers to a platform for interacting with a user. In some embodiments, the user platform may be configured as a terminal device. The terminal device may include a mobile device, a tablet computer, a laptop computer, or the like. The user may include technicians monitoring an operation of a device, or the like.

The service platform 120 refers to a platform for providing a device management services for the user. In some embodiments, the service platform may interact with the device management platform and the user platform. For example, the service platform may obtain an anomaly warning instruction uploaded by the device management platform and send the anomaly warning instruction to the user platform.

The device management platform 130 refers to a comprehensive management platform for data related to a device operation. In some embodiments, the device management platform may interact with the service platform and the device sensor network platform. For example, the device management platform may generate and send a sampling adjustment instruction to the device sensor network platform to adjust a preset sampling rate of the device sensor network platform obtaining operation data of an abnormal device via the device perceptual control platform.

In some embodiments, the device management platform may include a device management sub-platform and a management data center 132.

The device management sub-platform refers to a sub platform for managing data related to the device operation. In some embodiments, the device management platform may include a plurality of device management sub-platforms (as shown in FIG. 1, a device management sub-platform 131-1, a device management sub-platform 131-2, . . . , and a device management sub-platform 131-$n$, with n being a number of the device management sub-platforms).

In some embodiments, the device management sub-platform may generate a data collection instruction based on a preset sampling rate and send the data collection instruction to the management data center.

The management data center 132 refers to a platform for storing and managing information related to the system for determining a device anomaly. In some embodiments, the management data center may be configured as a storage device for storing data related to device operation, etc. For example, the operation data for a target device.

In some embodiments, a storage space of the management data center 132 may be divided into a plurality of blocks and perform a partitioned storage on the operation data based on a data source identification. One partition may store information related to one target device.

In some embodiments, the management data center 132 may create a partition index corresponding to the second processed data and store the second processed data within the partition corresponding to the partition index. The second processed data is obtained through a sensor general database.

In some embodiments, the device management platform 130 may be configured to determine an abnormal device based on the data source identification of the operation data in response to a data anomaly degree satisfying a preset condition.

In some embodiments, the device management platform 130 may be further configured to generate the anomaly warning instruction based on the abnormal device and the corresponding data anomaly degree of the abnormal device, and send the anomaly warning instruction to the user platform via the service platform.

In some embodiments, the device management platform 130 may be further configured to generate and send a sampling adjustment instruction to the device sensor network platform based on the data anomaly degree to adjust the preset sampling rate of the operation data of the abnormal device.

In some embodiments, the device management platform 130 may be further configured to generate and send a storage adjustment instruction to the management data center to adjust a storage partition size corresponding to the abnormal device in the management data center based on the data anomaly degree.

The device sensor network platform 140 refers to a platform that integrates a management of device-related sensor information. In some embodiments, the device sensor network platform may be configured as a communication network or gateway, etc. In some embodiments, the device sensor network platform may include a sensor general database 141, a sensor sub-database, and a sensor network sub-platform.

The sensor general database 141 refers to a general database that stores or manages the sensor information associated with a device. In some embodiments, the sensor general database may obtain first processed data through the sensor sub-database, perform a second preprocessing on the first processed data to obtain the second processed data, and send the second processed data to the management data center.

The sensor sub-database refers to a sub-database that stores or manages the sensor information associated with the device. In some embodiments, the device sensor network platform 140 may include a plurality of sensor sub-databases (as shown in FIG. 1, a sensor sub-database 143-1, a sensor sub-database 143-2, . . . , and a sensor sub-database 143-n, n being a number of the sensor sub-databases).

In some embodiments, the sensor sub-database may obtain the operation data through a device perceptual control sub-platform and send the operation data to the sensor network sub-platform corresponding to the sensor sub-database.

The sensor network sub-platform refers to a sub-platform that manages device-related sensor information. In some embodiments, the device sensor network platform 140 may include a plurality of sensor network sub-platforms (as shown in FIG. 1, a sensor network sub-platforms 142-1, a sensor network sub-platforms 142-2, . . . and a sensor network sub-platforms 142-n, with n being a number of the sensor network sub-platforms).

In some embodiments, the sensor network sub-platform 142 may include an edge computing module. The edge computing module may perform a data parsing, a verification, a classification labeling, a compression, a packaging, and other operations on the obtained data to reduce a computational task of the sensor general database.

In some embodiments, one sensor network sub-platform may correspond to one sensor sub-database, as shown in FIG. 1.

The device perceptual control platform 150 refers to a functional platform for sensor information generation and controlling information execution. In some embodiments, the device perceptual control platform may interact with the device sensor network platform. For example, the device perceptual control platform may upload the operation data to the device sensor network platform.

In some embodiments, the device perceptual control platform 150 may collect the operation data based on the preset sampling rate.

The device perceptual control sub-platform refers to a sub-platform for perception information generation and control information execution. In some embodiments, the device perceptual control platform 150 may include a plurality of device perceptual control sub-platforms (as shown in FIG. 1, a device perceptual control sub-platform 151-1, a device perceptual control sub-platform 151-2, . . . , and a device perceptual control sub-platform 151-n, with n being a number of the device perceptual control sub-platforms).

In some embodiments, the device perceptual control sub-platform may include a data collection module. The data collection module may collect and summarize data related to the target device and transmit the data to the corresponding sensor sub-database. The data collection module may include a plurality of collection devices. For example, the collection devices include a temperature sensor, a timer, and a status monitor that come with the target device etc.

In some embodiments, the device perceptual control sub-platform may correspond to one or more target devices. The device perceptual control sub-platform may obtain the operation data of the target device based on the preset sampling rate and upload the operation data to the sensor network sub-platform corresponding to the device perceptual control sub-platform.

In some embodiments, the system for determining a device anomaly 100 may further include a processor. In some embodiments, the processor may process information and/or data related to the system for determining a device anomaly 100 to perform one or more functions described in the present disclosure. In some embodiments, the processor may include one or more engines (e.g., a single-chip processing engine or a multi-chip processing engine). Merely by way of example, the processor may include a central processing unit (CPU), an application-specific integrated circuit (ASIC), an application-specific instruction processor (ASIP), a graphics processor (GPU), a physical processing unit (PPU), and a digital signal processor (DSP), or any combination of the above. In some embodiments, the processor may interact with a plurality of platforms (e.g., the device management platform, the device sensor network platform, the device perceptual control platform, etc.) included in the system for determining a device anomaly 100.

More descriptions of the foregoing can be found in FIGS. 2-5 and related descriptions.

According to some embodiments of the present disclosure, the system for determining a device anomaly 100 may form an information operation closed loop among various functional platforms, coordinate and operate regularly, and realize informatization as well as the intelligence of the monitoring of the operation status of the target device.

Figure 2:
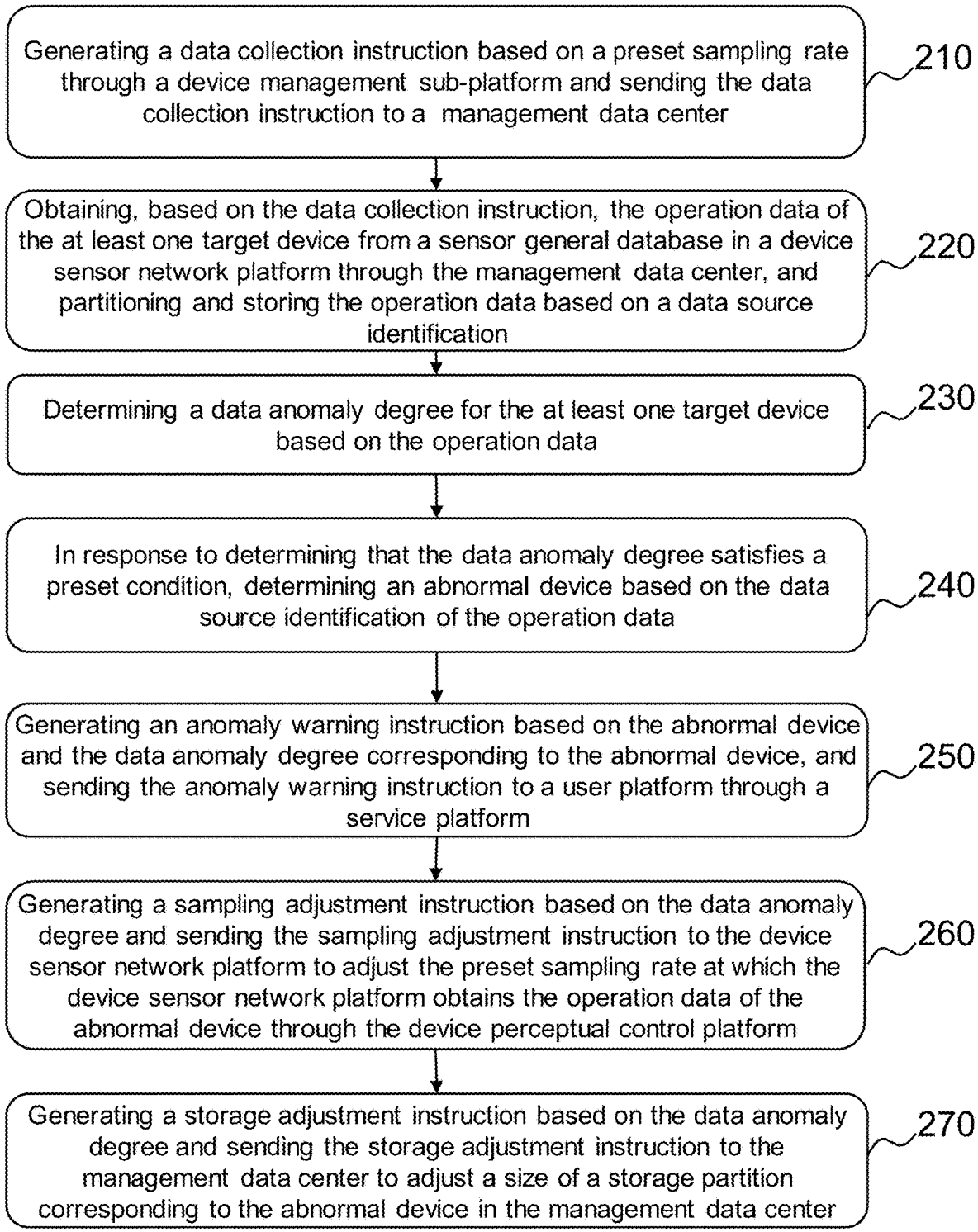
FIG. 2 is a flow chart illustrating an exemplary process for determining a device anomaly based on an IoT according to some embodiments of the present disclosure.

FIG. 2 is a flow chart illustrating an exemplary process for determining a device anomaly based on an IoT according to some embodiments of the present disclosure. In some embodiments, a process 200 is performed by a device management platform of a system for determining a device anomaly. As shown in FIG. 2, the process 200 includes the following steps.

In 210, generating a data collection instruction based on a preset sampling rate through a device management sub-platform and sending the data collection instruction to a management data center. For descriptions of the device management sub-platform and the management data center, please refer to FIG. 1 and the related descriptions.

The preset sampling rate refers to a frequency for obtaining operation data of a target device.

In some embodiments, the device management platform may determine the preset sampling rate based on a failure rate of the target device in historical data, for example, the higher the failure rate of the target device in the historical data, the higher the preset sampling rate of the target device. The failure rate refers to a frequency of a failure occurrence.

The device management platform may obtain the failure rate of the target device through the management data center.

The target device refers to a device monitored by the system for determining a device anomaly. In some embodiments, the target device may include the device that performs a quality test on product. The product may include a rubber product, a metal product, and a plastic product, etc. For example, the target device may include testing device corresponding to the rubber product, etc. Exemplarily the target device may include one or more of a tensile strength tester, a hardness tester, a rubber abrasion tester, etc.

In some embodiments, the system for determining a device anomaly may monitor a plurality of target devices, which are indicated by numbers, etc.

In some embodiments, one target device may correspond to one preset sampling rate.

In some embodiments, the device management sub-platform in the device management platform may generate the data collection instruction based on the preset sampling rate and send the data collection instruction to the management data center. The data collection instruction may include a plurality of target devices and the preset sampling rates corresponding to the target devices, etc.

In 220, obtaining, based on the data collection instruction, the operation data of the at least one target device from a sensor general database in a device sensor network platform through the management data center, and partitioning and storing the operation data based on a data source identification. For descriptions of the device sensor network platform and the sensor general database, please refer to FIG. 1 and the related descriptions. For descriptions of the data source identification, please refer to the descriptions below.

The operation data refers to log data related to a real-time operation state of the target device. In some embodiments, the target device may generate the operation data after performing a quality test of a product. The operation data of the target device may include a plurality of operation data corresponding to a plurality of products obtained based on the preset sampling rate.

In some embodiments, the operation data may include a plurality of operation sub-data. The operation sub-data may include at least one of device operation data, device statistics, device warning data, and test results.

The device operation data refers to real-time data related to the state of the target device itself. For example, the device operation data includes a current, a voltage, a power, a temperature, and an operation speed, etc.

The device statistics refers to data related to a usage of the target device. For example, the device statistics include an operation duration, a failure number, and a maintenance record, etc.

The device warning data refers to a warning issued by the target device itself. For example, the device warning data includes a noise warning, an over-temperature warning, and a pressure warning.

The test result refers to a result of a quality test of the product. In some embodiments, the test result may include qualified or unqualified as well as a result of a plurality of quality indicators. The quality indicators refer to criteria by which product quality is determined. In some embodiments, the quality indicators may be preset based on historical experience. In some embodiments, the quality indicators may include a weight, a fretting burr condition, a tensile and compressive strength, a deformation rate, and a recovery rate, etc.

In some embodiments, the device sensor network platform may collect the operation data of the target device through a device perceptual control platform and upload the operation data to the device management platform. For descriptions of the device perceptual control platform, please refer to FIG. 1 and the related descriptions.

In some embodiments, the device management platform may obtain the operation data through the device perceptual control platform via a sensor sub-database, and send the operation data to a sensor network sub-platform corresponding to the sensor sub-database. For descriptions of the sensor sub-database and the sensor network sub-platform, please refer to FIG. 1 and the related descriptions.

In some embodiments, the device management platform may perform a first preprocessing on the obtained operation data via the sensor network sub-platform to obtain first processed data and store the first processed data in the sensor sub-database.

In some embodiments, the device management platform may obtain the first processed data via the sensor general database through the sensor sub-database, and perform a second preprocessing on the first processed data to obtain second processed data and send the second processed data to the management data center.

In some embodiments, the device management platform may create a partition index corresponding to the second processed data through the management data center and store the second processed data in a partition corresponding to the partition index.

The first preprocessing refers to a processing of the operation data. For example, the first preprocessing may include at least one of a data parsing, a verification, a classification labeling, a compression, and a packaging, performed on the operation data.

The first processed data refers to data that has undergone the first preprocessing.

In some embodiments, the sensor sub-database may receive the operation data collected and uploaded by a device perceptual control sub-platform and send the operation data to the corresponding the sensor network sub-platform. An edge computing module in the sensor network sub-platform performs the first preprocessing on the obtained operation data, forms the first processed data, and stores the first processed data in the sensor sub-database.

The second preprocessing refers to processing the first processed data. In some embodiments, the second preprocessing may include data source identification the first processed data. The data source identification refers to a labeling of a source device of the first processed data.

The second processed data refers to data that has undergone the second preprocessing. For example, the second processed data may be a set including data that has undergone the second preprocessing.

In some embodiments, the sensor general database may obtain the first processed data through the sensor sub-database and perform the second preprocessing on the first processed data to obtain the second processed data and send the second processed data to the management data center.

In some embodiments, the management data center may perform a partitioned storage on the second processed data in various ways. For example, the management data center may divide a storage space into a plurality of partitions and number each partition, and store the second processed data sequentially in different partitions in an order of the numbering.

In some embodiments, the management data center may divide the storage space into a plurality of partitions and create partition indexes corresponding to the second processed data, and store the second processed data in the partitions corresponding to the partition indexes.

According to some embodiments of the present disclosure, the sensor general database and the management data center adopt central computing to ensure a unified and safe management of data. The system for determining a device anomaly adopts a combination of an edge computing and a central computing. The edge computing module in the sensor network sub-platform is able to pre-process the data near a data source, which greatly reduces data transmission bandwidth requirements, and improves an efficiency of data transmission. At the same time, as the data preprocessing is performed in the edge computing module, a delay in data transmission and processing is reduced, enabling the system for determining a device anomaly to respond more quickly to changes in the device operation data.

The first processed data is stored in the sensor sub-database, providing an efficient data source for further processing and analysis. After obtaining the first processed data from the sensor sub-database, the sensor general database forms the second processed data through the data source identification. The management data center creates the partition indexes based on the data source identification and stores the data in the corresponding partitions, which make the data management more orderly and facilitate subsequent data retrieval and analysis.

The system for determining a device anomaly is able to access to the more device perceptual control sub-platforms to achieve a centralized management of great-scale devices. At the same time, as the data preprocessing and storage are performed based on the data source identification, the system for determining a device anomaly may flexibly adapt to needs of different devices and different data sources.

In 230, determining a data anomaly degree for the at least one target device based on the operation data.

The data anomaly degree is used to indicate a degree of anomaly of the operation data of the target device. One target device corresponds to one data anomaly degree. In some embodiments, the data anomaly degree may be expressed by a numerical value etc., e.g., the greater a numerical value, the higher the data anomaly degree indicating the operation data.

In some embodiments, the device management platform may respectively calculate, based on the operation data of the target device, a mean value and a standard deviation of each operation sub-data, construct a state vector based on the mean value and the standard deviation, and retrieve in a state vector database based on the state vector, and select a plurality of reference state vectors that satisfy a preset retrieval condition with the state vectors. The state vector includes the mean value and the standard deviation of each type of operation sub-data. The operation data of the target device may include a plurality of operation data corresponding to a plurality of products obtained based on the preset sampling rate.

In some embodiments, the device management platform may calculate a number of abnormal state vectors among the plurality of reference state vectors that satisfy a preset retrieval condition and calculate a ratio of the number of the plurality of abnormal state vectors to a total number of the reference state vectors to obtain an anomaly rate. The device management platform may compare the anomaly rate with a first staircase, select the staircase in the first staircase that contains the anomaly rate, and determine a grade corresponding to the staircase as the data anomaly degree of the target device. The abnormal state vector refers to the reference state vector corresponding to an anomaly occurring in the target device.

In some embodiments, the device management platform may respectively determine the data anomaly degree corresponding to each of the target devices respectively by the manner described above.

In some embodiments, the first staircase may be preset based on the historical experience. In some embodiments, the first staircase may include a plurality of percentage intervals and corresponding grades. For example, a percentage interval corresponding to a rank of 1 is 0 to 10%, a percentage interval corresponding to a rank of 2 is 110% to 20%, and a percentage interval corresponding to a rank of 3 is 20% to 30%, etc.

In some embodiments, the state vector database may be preset based on the historical experience. The state vector database may include the plurality of reference state vectors. The reference state vector refers to a state vector constructed by the operation data obtained by a quality test of a batch of products of the target device in the historical data, and the reference state vector is constructed in the same manner as the state vector. In some embodiments, the reference state vector may also include whether an anomaly happens, an anomaly type, and an anomaly cause of the target device during a process of the target device performing the quality test on the batch of products. Whether the anomaly happens, the anomaly type, and the anomaly cause of the target device may be obtained by a user input, etc.

The anomaly occurring to the target device may include any quality indicators exceeding a corresponding quality threshold. Each quality indicator may correspond to a quality threshold. The quality threshold may be preset based on the historical experience.

The anomaly type may include a quality indicator exceeding the quality threshold.

The anomaly cause refers to a cause that triggers the anomaly. In some embodiments, the anomaly cause may be determined and entered into the system for determining a device anomaly by a technician after overhauling the target device.

In some embodiments, the preset retrieval condition may be preset based on the historical experience. For example, the preset retrieval condition may be that a similarity degree with the state vector exceeds a similarity degree threshold, and may also be that the reference state vector ranks higher than a preset ranking position in a rank of similarity degree with the state vector. The similarity degree threshold, and the preset ranking position may be preset based on the historical experience.

In some embodiments, the device management platform may determine the data anomaly degree based on the operation data and an anomaly threshold. The device management platform may also determine the data anomaly degree based on a first diagnostic result obtained from a quality test of a diagnostic sample by a target device. The device management platform may also determine the data anomaly degree based on a reference quality difference and a test quality difference. The device management platform may also determine the data anomaly degree based on various state abnormal probabilities. According to some embodiments of the present disclosure, this section of the content may be found in FIG. 4 and the related descriptions.

In 240, in response to determining that the data anomaly degree satisfies a preset condition, determining an abnormal device based on the data source identification of the operation data.

In some embodiments, the preset condition may include the data anomaly degree exceeding the anomaly threshold. The anomaly threshold may be preset based on the historical experience.

The abnormal device refers to a target device where anomalies occur.

In some embodiments, in response to that the data anomaly degree satisfies the preset condition, the device management platform may determine the target device corresponding to the operation data based on the data source identification of the operation data and identify the target device as the abnormal device.

In 250, generating an anomaly warning instruction based on the abnormal device and the data anomaly degree corresponding to the abnormal device, and sending the anomaly warning instruction to a user platform through a service platform. For descriptions on the service platform and the user platform, please refer to FIG. 1 and the related descriptions.

The anomaly warning instruction refers to an instruction that notifies the user of information related to the abnormal device. In some embodiments, the anomaly warning instruction may include the data anomaly degree, the anomaly type, the anomaly cause, and a handling plan. The handling plan may be preset by the technician based on the anomaly type, the anomaly cause, etc.

In some embodiments, the device management platform may, based on the plurality of abnormal state vectors selected in the above-described process of determining the data anomaly degree, as well as the anomaly type and the anomaly cause corresponding to the anomaly type in each anomaly state vector, rank the abnormal state vectors according to a number of anomaly occurrences in ascending order, and determine the anomaly type with the highest number of occurrences and the anomaly cause corresponding to the anomaly type as the anomaly type and the anomaly cause in the anomaly warning instruction.

In 260, generating a sampling adjustment instruction based on the data anomaly degree and sending the sampling adjustment instruction to the device sensor network platform to adjust the preset sampling rate at which the device sensor network platform obtains the operation data of the abnormal device through the device perceptual control platform.

The sampling adjustment instruction refers to an instruction that adjusts a preset sampling rate of the abnormal device. In some embodiments, the sampling adjustment instruction may include an adjusted preset sampling rate, etc.

In some embodiments, the device management platform may determine the adjusted preset sampling rate based on a number of times the data anomaly degree exceeding the anomaly threshold. For example, the higher the number of times the data anomaly degree exceeding the anomaly threshold, the higher the adjusted preset sampling rate.

In some embodiments, the device management platform may obtain the number of times the data anomaly degree of the abnormal device exceeding the anomaly threshold through the management data center.

In some embodiments, the device management platform may determine a target sampling rate based on a sampling adequacy degree and at least one candidate sampling rate, and send, based on the target sampling rate, the sampling adjustment instruction to the device sensor network platform. For descriptions on this section, please refer to FIG. 3 and the related descriptions.

In 270, generating a storage adjustment instruction based on the data anomaly degree and sending the storage adjustment instruction to the management data center to adjust a size of a storage partition corresponding to the abnormal device in the management data center.

The storage adjustment instruction refers to an instruction that adjusts the size of the storage partition. In some embodiments, the storage adjustment instruction may include an adjusted size of the storage partition corresponding to the abnormal device.

In some embodiments, the device management platform may determine the adjusted size of the storage partition corresponding to the abnormal device based on the number of times the data anomaly degree exceeding an anomaly threshold. For example, the higher the number of times the data anomaly degree exceeding the anomaly threshold, the higher the adjusted preset sampling rate, and the more storage partitions corresponding to the abnormal device need to be.

In some embodiments of the present disclosure, the data anomaly degree of the target device is determined through the operation data, and then the abnormal device is determined, which realizes a real-time monitoring of the state of the device, and quickly and accurately diagnose the anomaly of the device and provide an early warning. In this way, the operation efficiency and reliability of the device is improved, a production cost is reduced, and a safety and continuity of industrial production is ensured.

It should be noted that the foregoing description of the process 200 is intended to be exemplary and illustrative only and does not limit the scope of application of the present disclosure. For those skilled in the art, various corrections and changes to the process hand-eye calibration may be made under the guidance of the present disclosure. However, these corrections and changes remain within the scope of the present disclosure.

Figure 3:
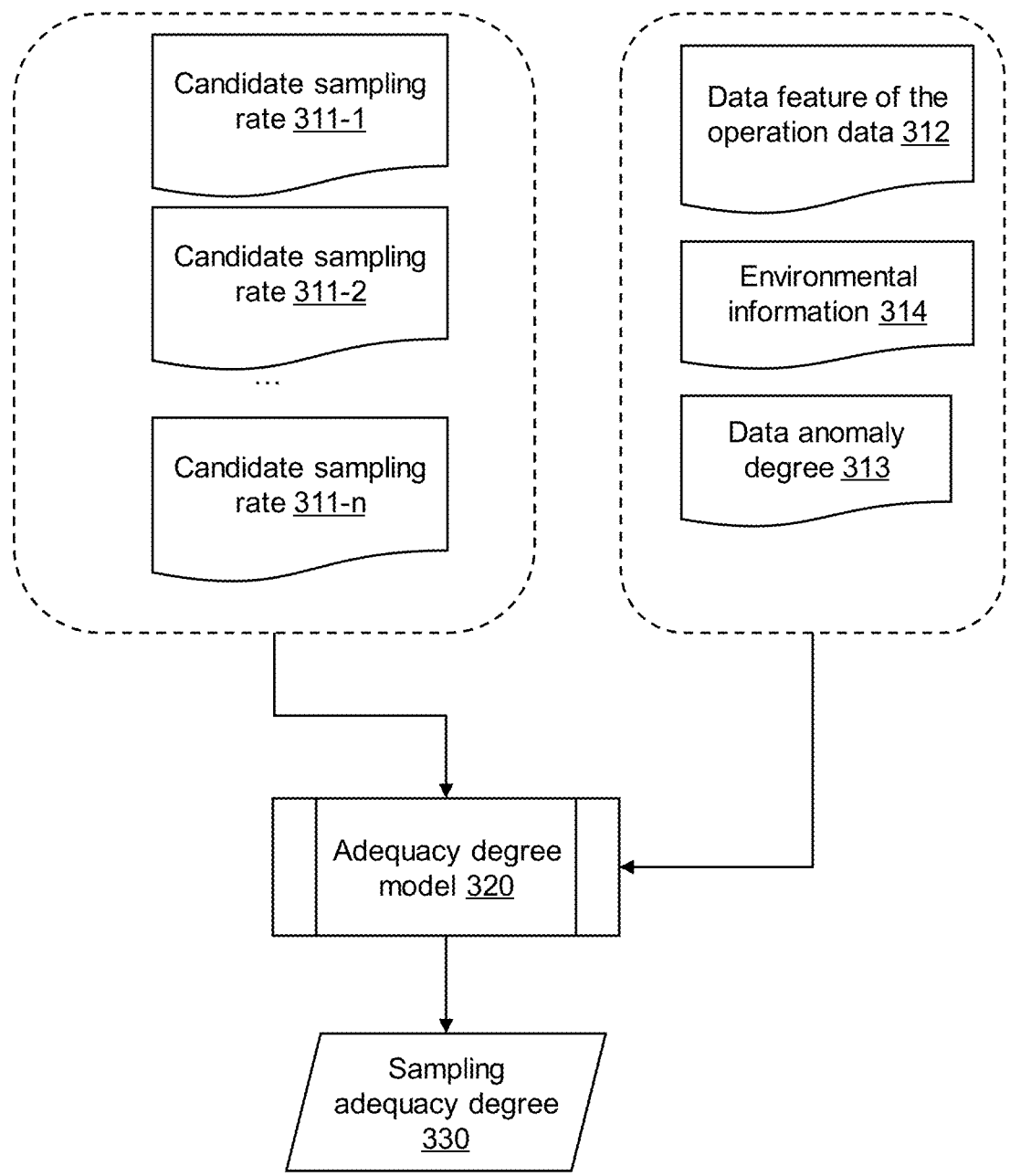
FIG. 3 is a schematic diagram illustrating an exemplary adequacy degree model according to some embodiments of the present disclosure.

FIG. 3 is a schematic diagram illustrating an exemplary adequacy degree model according to some embodiments of the present disclosure.

In some embodiments, a device management platform may generate at least one candidate sampling rate (e.g., a candidate sampling rate 311-1, a candidate sampling rate 311-2, . . . , a candidate sampling rate 311-n, n being a number of the candidate sampling rates) based on a preset sampling rate and a data anomaly degree 313. The device management platform may evaluate, based on at least one candidate sampling rate 311, the data anomaly degree 313, a data feature of the operation data 312, and environmental information 314, a sampling adequacy degree 330 through an adequacy degree model 320. The device management platform may determine the target sampling rate based on the sampling adequacy degree 330 and the at least one candidate sampling rate 311, and based on the target sampling rate, send a sampling adjustment instruction to a device sensor network platform. For descriptions of the data anomaly degree, and the preset sampling rate, please refer to FIG. 2 and the related descriptions.

The candidate sampling rate refers to a sample rate to be determined as the preset sampling rate.

In some embodiments, the device management platform may calculate a ratio of the data anomaly degree exceeding an anomaly threshold to the anomaly threshold to obtain an anomaly rate, calculate a product of the preset sampling rate and the anomaly rate to obtain an expanded value, take a sum of the expanded value and the preset sampling rate as a center value of the candidate sampling rate, and generate the plurality of candidate sampling rates based on the center value of the candidate sampling rate according to a preset step size. The anomaly rate is used to indicate how much the data anomaly degree exceeds the anomaly threshold, for example, the higher the anomaly rate, the more the data anomaly degree exceeds the anomaly threshold. The preset step size may be set in advance based on historical experience.

Exemplarily, the anomaly rate is 30% and the preset sampling rate is 9 Hz, then the expanded value of the preset sampling rate is 3 Hz, the center value of the candidate sampling rate is 12 Hz, and the plurality of candidate sampling rates are generated on both sides of the center value in a preset step (e.g., 0.1 Hz) of 11.1 Hz, 11.2 Hz, 11.3 Hz, . . . , 12.7 Hz, 12.8 Hz, 12.9 Hz, etc. The above example is only used to illustrate a process of determining the candidate sampling rate, and is not equivalent to the process of actually determining the candidate sampling rate.

The sampling adequacy degree is used to indicate an extent to which the operation data obtained based on the candidate sampling rate accurately reflects whether or not an anomaly occurs in a target device. The higher the sampling adequacy degree, the more accurately the operation data obtained based on the candidate sampling rate reflects whether the anomaly occurs in the target device.

The data feature of the operation data is used to indicate how the operation data differs from each other. In some embodiments, the data feature of the operation data are represented by a state vector. For descriptions of the state vector, please refer to FIG. 2 and the related descriptions.

The environmental information is data related to an environment in which the target device is located. In some embodiments, the environmental information may include a temperature and a humidity of the environment in which the target device is located.

In some embodiments, the device management platform may obtain the environmental information through the device sensor network platform and the device perceptual control platform sequentially. The device perceptual control platform may obtain the environmental information through a plurality of sensors deployed around the target device. The sensors may include a temperature sensor, a humidity sensor, etc.

The adequacy degree model refers to a model used to determine the sampling adequacy degree. In some embodiments, the adequacy degree model may be a machine learning model. For example, the adequacy degree model may include any one or a combination of a deep neural network (DNN) model, a neural networks (NN) model, or other customized model structures.

In some embodiments, the device management platform may train the adequacy degree model based on a great number of first training samples with first labels by, e.g., a gradient descent method. The first training sample may include a sample candidate sampling rate, a sample data anomaly degree, a data feature of the sample operation data, and sample environmental information, and the first label of the first training sample may be an actual sampling adequacy degree. In some embodiments, the first training sample may be obtained based on historical data.

In some embodiments, the first label may be determined based on manual labeling. For example, a technician may determine a time interval between a moment when an anomaly actually occurs in the target device corresponding to the first training sample and a moment when the anomaly is tested in the target device as the actual sampling adequacy degree of the first training sample.

The shorter the time interval between the moment when the target device actually has an anomaly and the moment when the target device is tested to the anomaly, the timelier a discovery of the target device is tested to have the anomaly, and the higher the sampling adequacy degree of the operation data, which in turn indicates that the sample operation data based on the sample candidate sampling rate is able to accurately reflect the anomaly occurrence of the target device. The moment when the target device is tested to be abnormal may be the moment when the device management platform issues an anomaly warning instruction.

In some embodiments, the moment at which the target device is actually abnormal may be determined by the technician when the technician performs an actual overhaul after the anomaly occurs to the target device. In some embodiments, the moment at which the target device is actually abnormal may also be determined by the technician based on a test result of the product. For example, the technician may use the moment when the test result of the target device for the product goes wrong for the first time the moment at which the target device is actually abnormal.

In some embodiments, the adequacy degree model may be trained by inputting a plurality of training samples with training labels into an initial adequacy degree model, constructing a loss function from the training labels and prediction results of the initial adequacy degree model, iteratively updating the initial adequacy degree model based on the loss function, and completing the training when the loss function of the initial adequacy degree model satisfies a preset iteration condition. The preset iteration condition may be that the loss function converges, a number of iterations reaches a set value, etc.

The target sampling rate refers to a preset sampling rate determined.

In some embodiments, for example, the device management platform may determine the candidate sampling rate for which the sampling adequacy degree satisfies a target condition as the target sampling rate and, based on the target sampling rate, send the sampling adjustment instruction to the device sensor network platform to adjust the preset sampling rate for obtaining the operation data of the abnormal device by the sensor network platform through the device perceptual control platform. The target condition may include the sampling adequacy degree being the highest.

According to some embodiments of the present disclosure, by utilizing a self-learning capability of the machine learning model to find a pattern from a great amount of data, the accuracy and efficiency of determining the sampling adequacy degree is improved, which is conducive to selecting a sampling rate that is able to obtain the operation data of the target device that better reflects whether the target device has an anomaly, and then adjusting the preset sampling rate for obtaining the operation data of the abnormal device.

FIG. 4 is a flow chart illustrating an exemplary process for determining a data anomaly degree according to some embodiments of the present disclosure. In some embodiments, a process 400 is performed by a device management platform of a system for determining a device anomaly. As shown in FIG. 2, the process 400 includes the following steps.

In 410, obtaining historical operation data of the at least one target device, and performing a third preprocessing on the historical operation data to obtain third processed data.

The historical operation data refers to operation data during a preset window period in historical data. The preset window period refers to a period of time in a historical time. In some embodiments, the preset window period may be preset based on historical experience.

In some embodiments, the preset window period may be related to historical anomaly data for the target device.

The historical anomaly data refers to data in the historical data that is associated with an anomaly of the target device. In some embodiments, the historical anomaly data may include moments in the historical data when the target device was actually abnormal. For descriptions of the moments when the target device is actually abnormal, please refer to FIG. 3 and the related descriptions.

In some embodiments, the device management platform may use a time period between moments in the historical anomaly data when two adjacent target devices were actually abnormal as a preset window period.

According to some embodiments of the present disclosure, a time period in which the target device does not have the anomaly is taken as a preset window period, so as to avoid fluctuations in the historical operation data obtained due to the occurrence of the anomaly of the target device, which in turn leads to the anomaly threshold not being sufficiently accurate.

In some embodiments, the device management platform may obtain the historical operation data for the at least one target device via a management data center. For descriptions of the operation data, please refer to FIG. 2 and the related descriptions.

The third processed data refers to the historical operation data after a third preprocessing. In some embodiments, the third preprocessing may include at least one of a data cleansing, or a structured processing, etc. The data cleansing refers to removing invalid, duplicate, or incorrectly formatted data. The structured processing refers to organizing and structuring data according to a preset rule. The preset rule may be preset based on the historical experience.

In 420, determining a data feature of the third processed data based on the third processed data.

The data feature of the third processed data is used to indicate differences among the operation data in the third processed data. In some embodiments, the data feature of the third processed data may include respective mean values and standard deviations of each operation sub-data in the third processed data.

In some embodiments, the device management platform may determine the data feature of the third processed data by determining the mean value and the standard deviation of the operation sub-data as described above. For descriptions of the mean value and the standard deviation of the operation sub-data, please refer to FIG. 2 and the related descriptions.

In 430, determining an anomaly threshold range based on the data feature of the third processed data.

The anomaly threshold range is used to determine a range of values for the data anomaly degree. In some embodiments, the anomaly threshold range may include a plurality of numerical ranges, and each numerical range may correspond to a rank, the higher the rank, the greater the data anomaly degree.

In some embodiments, the device management platform may determine the anomaly threshold range based on the data feature of the third processed data in various ways. For example, the device management platform may query, based on the data feature of the third processed data, a reference data feature in a preset range table that is the same as the data feature, and determine a reference threshold range corresponding to the reference data feature as the anomaly threshold range. The preset range table may be set in advance. The preset range table may include a plurality of reference data features and the reference threshold range corresponding to each of the reference data features. The reference data features may be obtained based on the historical data, and the reference threshold range may be preset based on the historical experience.

In some embodiments, for each type of the operation sub-data in the third processed data, the device management platform may determine a range between a mean value of the operation sub-value minus one standard deviation value and the mean value of the operation sub-value plus one standard deviation value as a level1 sub-range based on the mean value and the standard deviation value of the operation sub-data; and determine a range between the mean value of the operation sub-value minus one standard deviation value and the mean value of the operation sub-value minus two standard deviation values as a left range of a level2 sub-range, determine a range between the mean value of the operation sub-value plus one standard deviation value and the mean value of the operation sub-value plus two standard deviation values as a right range of a level2 sub-range, and combine the left range of the level2 sub-range and the right range of the level2 sub-range into a level2 sub-range. A plurality of sub-ranges are obtained accordingly.

In some embodiments, the device management platform may determine the plurality of sub-ranges for each type of operation sub-data in the third processed data by the manner of determining the plurality of sub-ranges for one type of operation sub-data described above, and combining the plurality of sub-ranges for each type of operation sub-data in accordance with a range level as the anomaly threshold range.

In 440, determining a data anomaly degree based on the operation data and the anomaly threshold range.

In some embodiments, the device management platform may determine at least one data anomaly degree based on the operation data and the anomaly threshold range in various ways. For example, the device management platform may sequentially determine, based on a fluctuation range of the operation data and the anomaly threshold range, a containment relationship between the fluctuation range and the anomaly threshold range. When the fluctuation range is completely contained in a value range for the first time, the determination stops, and the level corresponding to the value range is taken as an anomaly level, and the anomaly level is determined as the data anomaly degree of the target device.

In some embodiments, for each of the operation sub-data in the operation data, the device management platform may select a maximum value and a minimum value of the operation sub-data, and determine a value range between the maximum value and the minimum value as the fluctuation range of the operation sub-data. The device management platform may combine the fluctuation range for each of the operation sub-data into a fluctuation range for the operation data.

In some embodiments, the operation data may include a test result. In response to the test result satisfies a first diagnosis condition, the device management platform may perform a first diagnosis on the target device, determine the data anomaly degree based on a first diagnostic result. In some embodiments, the first diagnosis includes generating a first diagnostic instruction based on the operation data and the anomaly threshold range, and sending the first diagnostic instruction to the device perceptual control platform via the device sensor network platform to control a diagnostic device of the device perceptual control platform to deliver a diagnostic sample to the target device; and determining the data anomaly degree based on the first diagnostic result obtained through a quality test on the diagnostic sample by the target device. For a description of the test result, please refer to FIG. 2 and the related descriptions.

The first diagnosis condition is used to determine whether the first diagnosis is required for the target device. In some embodiments, the first diagnosis condition may be preset based on the historical experience. For example, the first diagnosis condition may be that a number of consecutive test results in the operation data that are qualified exceeds a first number threshold. The first diagnosis condition may also be that the number of test results in the operation data that are unqualified exceeds a second number threshold. The second number threshold may be preset based on the historical experience.

In some embodiments, the device management platform may determine the first number threshold based on distribution information of the unqualified products with in the historical data. For example, if there are 500 qualified products between two unqualified products in the historical data, the first number threshold may be 500, and the first diagnosis condition may be that the number of consecutive the qualified test results in the operation data exceeds 500.

The first diagnosis refers to testing the target device with the diagnostic sample. In some embodiments, the first diagnosis may include the device management platform generates, based on the operation data and the anomaly threshold range, the first diagnostic instruction, and sends the first diagnostic instruction to the device perceptual control platform through the device sensor network platform to control the diagnostic device of the device perceptual control platform to deliver the diagnostic sample to the target device.

The diagnostic sample are products with known test results.

The diagnostic device refers to a device that delivers the diagnostic sample to the target device. For example, the diagnostic device includes a deliver belt, a robotic arm, etc.

The first diagnostic instruction refers to an instruction for controlling the diagnostic device of the device perceptual control platform to deliver the diagnostic sample to the target device. In some embodiments, the first diagnostic instruction may include information for initiating the first diagnosis, a number of diagnostic samples sent by the diagnostic device to the target device, and types of the diagnostic samples, etc.

In some embodiments, the device management platform may determine the first diagnostic instruction based on the anomaly level corresponding to the operation data by means of a preset correspondence relationship. The preset correspondence relationship refers to a correspondence relationship between the anomaly level and the number and the type of the diagnostic samples. The preset correspondence relationship may be set in advance based on the historical experience, for example, the higher the anomaly level, the higher the number and the type of the diagnostic samples sent by the diagnostic device to the target device.

In some embodiments, the target device may perform the quality test on the diagnostic sample based on a first diagnosis quality.

The first diagnostic result is a test result obtained by the target device performing the quality test on the diagnostic sample. In some embodiments, the first diagnostic result may be obtained by performing the first diagnosis on the target device. In some embodiments, the first diagnostic result may include a plurality of diagnostic sub-results. The diagnostic sub-result refers to the test result obtained by the target device performing the quality test on the diagnostic sample.

In some embodiments, the device management platform may determine the data anomaly degree based on the first diagnostic result. For example, the device management platform may perform a weighted summation on the accuracy of each quality indicator based on an accuracy and a weight of each quality indicator in each diagnostic sub-result to obtain a weighted value corresponding to each diagnostic sub-result, respectively. The device management platform may further calculate an average value of the weighted values corresponding to each diagnostic sub-result respectively; compare the average value with a second staircase, select the staircase containing the average value in the second staircase, and determine a level corresponding to the staircase as the data anomaly degree of the target device.

The accuracy of the quality indicator is used to indicate a deviation between the quality indicator in the diagnostic sub-results and the actual quality indicator of the diagnostic sample. In some embodiments, the device management platform may calculate a difference between the quality indicator in the diagnostic sub-result and the actual quality indicator of the diagnostic sample, and determine a ratio of the difference to the actual quality indicator of the diagnostic sample as the accuracy of the diagnostic quality indicator.

In some embodiments, the second staircase may be preset based on the historical experience. In some embodiments, the second staircase may include a plurality of percentage intervals and corresponding levels. For example, the percentage intervals 0 to 10% corresponds to a level 1, 10% to 20% corresponds to a level 2, and 20% to 30% corresponds to a level 3, etc.

In some embodiments, the weight of each quality indicator may be related to an allowable deviation corresponding to each quality indicator, respectively. The allowable deviation refers to a value range of the quality indicator that is acceptable. Each diagnostic sub-result corresponds to a different diagnostic sample type, and each diagnostic sample has a different allowable deviation for the quality indicator, and thus each diagnostic sub-result corresponds to a different weight for the quality indicator. The allowable deviation may be preset based on the historical experience.

In some embodiments, the device management platform may determine the weight for each quality indicator based on the allowable deviation corresponding to each quality indicator, respectively. For example, the device management platform may assign a greater weight to a quality indicator with a smaller allowable deviation and a smaller weight to a quality indicator with a greater allowable deviation. Understandably, the quality indicator with smaller allowable deviation is more sensitive to whether the target device is abnormal, and assigning greater weights to the quality indicators with smaller deviations facilitates obtaining a more accurate data anomaly degree.

In some embodiments of the present disclosure, by performing the first diagnosis on the target device, the test result of the qualified product may be obtained by the target device, and based on the test result, a more realistic data anomaly degree may be determined, which in turn facilitates subsequent accurate determination of whether to generate the anomaly warning instruction.

In some embodiments, in response to the first diagnostic result satisfies a second diagnosis condition, the device management platform may perform a second diagnosis on the target device.

The second diagnosis condition is used to determine whether the target device needs to perform the second diagnosis on the target device. In some embodiments, the second diagnosis condition may be preset based on the historical experience. For example, the second diagnosis condition may be a number of times in the historical data that a data anomaly degree determined based on the first diagnostic result is consecutively smaller than the anomaly threshold exceeding a third number threshold.

In some embodiments, the device management platform may determine the third number threshold based on the first diagnostic result. For example, the device management platform may determine the third number threshold based on a sum of the allowable deviations of the plurality of diagnostic samples corresponding to the first diagnostic result. The smaller the sum of the allowable deviations of the plurality of diagnostic samples, the higher the third number threshold. The allowable deviation of the diagnostic samples refers to an average value of the allowable deviations of the each quality indicator of the diagnostic sample.

It may be understood that the data anomaly degree determined based on the first diagnosis result being less than the anomaly threshold for a plurality of consecutive times may be due to a fact that the first diagnosis fails to identify a hidden anomaly of the target device, therefore the device management platform performs a more in-depth second diagnosis on the target device.

The second diagnosis refers to a further diagnosis on the target device after the first diagnosis. In some embodiments, the second diagnosis may include obtaining a production similarity degree of production information for a plurality of production batches, determining an evaluation production batch based on the production similarity degree; determining a reference quality difference based on evaluation production information for the evaluation production batch; and determining the data anomaly degree based on the reference quality difference and a test quality difference.

The production batch refers to a plurality of products that are inspected by the target device during a preset time period. In some embodiments, the preset time period may be preset based on the historical experience. For example, the preset time period may be an hour or a day, etc.

The production information refers to information related to products in the production batch. In some embodiments, the production information may include raw material information, a product model, and a production process. The raw material information refers to raw materials used to manufacture the product. The production process refers to a process used to manufacture the product.

In some embodiments, the device management platform may obtain the production information for the plurality of production batches through the management data center.

In some embodiments, the device management platform may construct a plurality of to-be-matched vectors based on the production information of each of the plurality of production batches, match the plurality of to-be-matched vectors with a mean value vector, and determine a similarity degree between each to-be-matched vector and the mean value vector as the production similarity degree of the production batch corresponding to the to-be-matched vector. The to-be-matched vectors may be feature vectors constructed based on the raw material information, the product model, and the production process. The similarity degree of the vectors is negatively correlated to a distance between the vectors, which is a cosine distance, etc. The mean value vector refers to a vector that consists of the mean value of each element of the plurality of vectors to be matched. The elements in the vector to be matched may be data indicating any of the raw material information, the product model, and the production process.

The evaluation production batch refers to a production batch that is used to determine the data anomaly degree of the target device.

In some embodiments, the device management platform may determine the evaluation production batch based on the production similarity degree. For example, the device management platform selects the plurality of production batches with different production similarity degrees as the evaluation production batch. Distribution densities of the production similarity degree of the plurality of production batches in the different evaluation production batches are different.

The production similarity degree of the plurality of production batches may be indicated by a sequence, etc. For example, the production similarity degree of the plurality of production batches may be [90%, 88%, 86%, 84%, 82%, . . . ], with each element of the sequence indicating the production batch of the production similarity degree.

In some embodiments, the device management platform may determine the distribution density of the production similarity degree based on the first diagnostic result. For example, the device management platform may determine the distribution density of the production similarity degree based on an accuracy of each quality indicator in the first diagnostic result, the lower the accuracy of each quality indicator, the higher the distribution density of the production similarity degree.

Exemplarily, compared to a plurality of sequences with a sequence of [90%, 85%, 70%, . . . ] similarities, a plurality of production similarity degree with a sequence of [90%, 88%, 86%, . . . ] have a higher distribution density.

The reference quality difference refers to a theoretical quality difference between a plurality of evaluation production batches. In some embodiments, the reference quality difference may include a difference between a historical qualified rate of the products corresponding to the plurality of evaluation production batches.

In some embodiments, the reference quality difference may be indicated in a form of a sequence or a vector. For example, the reference quality difference may be [(A1, A2, M1), (A1, A3, M2), . . . ], where A1 denotes a product corresponding to a first evaluation production batch in the evaluation production batch, A2 denotes a product corresponding to a second evaluation production batch in the evaluation production batch, A3 denotes a product corresponding to a third evaluation production batch in the evaluation production batch, M1 denotes a difference between the historical qualified rate of A1 and the historical qualified rate of A2, and M2 denotes the difference between the historical qualified rate of A1 and the historical qualified rate of A3. Each evaluation production batch corresponds to a different product model of the product.

The historical qualified rate of the product refers to a ratio of products with a qualified test result to a total number of the products tested in the historical data.

In some embodiments, the device management platform may obtain, based on the product model in the evaluation production information of each evaluation production batch, a historical qualified rate corresponding to the product model through the management data center, and calculate a difference between the historical qualified rates of different evaluation production batches. The evaluation production information refers to the production information of the evaluation production batch.

In some embodiments, the device management platform may construct a production vector based on environmental information and the evaluation production information of the evaluation production batch; determine a reference quality data for the evaluation production batch by searching in a quality vector database based on the production vector; and, determine the reference quality difference based on the reference quality data.

The environmental information of the evaluation production batch refers to the environmental information at a time of testing the evaluation production batch with the target device. For descriptions on the environmental information, please refer to FIG. 3 and the associated descriptions.

The production vector may be a feature vector constructed based on the evaluation production information and the environmental information of the evaluation production batch.

The reference quality data refers to data related to the quality of products in the evaluation production batch. In some embodiments, the reference quality data may include an actual qualified rate and an abnormal quality indicator, etc. in the evaluation production batch. The actual qualified rate of the evaluation production batch refers to the a ratio of the products in the evaluation production batch with a qualified test result to the total number of products in the evaluation production batch. The abnormal quality indicator refers to a quality indicator that is unqualified in the evaluation production batch.

In some embodiments, the device management platform may match, based on the production vector, a reference production vector in the quality vector database that satisfies a preset matching condition with the production vector, and determine, based on the reference quality data corresponding to the reference production vector that satisfies the preset matching condition, the reference quality data as the reference quality data corresponding to the evaluation production batch. In some embodiments, the preset matching condition may include a vector distance being less than a distance threshold, the vector distance may include a Euclidean distance, a cosine distance, etc., and the distance threshold may be preset.

In some embodiments, the quality vector database may be preset based on the historical experience. In some embodiments, the quality vector database may include a plurality of reference production vectors and the reference quality data corresponding to each reference production vector. The reference production vector refers to the feature vector constructed based on the evaluation production information and the environmental information for the evaluation production batches in historical data. The actual qualified rate of the evaluation production batch in the reference quality data may be accessible by the device management platform through the management data center. A type of quality problems in the reference quality data may be determined based on manual labeling, etc.

In some embodiments, the reference quality difference may be indicated in the sequence or the vector. For example, the reference quality difference may be [(A1, A2, M1, X1), (A1, A3, M2, X2), . . . ]. Descriptions of A1, A2, A3, M1, and M2 may be found in the relevant descriptions above; X1 denotes a difference between the value of the abnormal quality indicator for A1 and the value of the abnormal quality indicator for A2, and X2 denotes a difference between the value of the abnormal quality indicator of A1 and the value of the abnormal quality indicator of A3.

In some embodiments, the device management platform may calculate a difference between the same abnormal quality indicators of different evaluation production batches based on the reference quality data of the evaluation production batches.

According to some embodiments of the present disclosure, the reference quality data for the evaluation production batch may be quickly determined by matching with the reference production vectors in the quality vector database, and further, the reference quality difference is quickly determined.

The test quality difference refers to an actual quality difference of the plurality of evaluation production batches. In some embodiments, the test quality difference may include a difference between the actual qualified rates of the plurality of evaluation production batches. In some embodiments, the test quality difference may be obtained by the quality test of products in the evaluation production batches by the target device.

In some embodiments, the test quality difference is similar in form to the reference quality difference, with a difference being that the test quality difference includes a difference between different actual qualified rates.

In some embodiments, the device management platform may obtain the actual qualified rates of the plurality of production batches through the management data center and calculate the difference between different actual qualified rates.

In some embodiments, the device management platform may determine the data anomaly degree based on the reference quality difference and the test quality difference in various ways. For example, the device management platform may calculate a difference between the test quality difference and each element in the reference quality difference, and calculate a ratio of the difference of each element to a corresponding element in the reference quality difference to obtain a plurality of deviation rates, and determine the data anomaly degree based on the plurality of deviation rates. One element in the reference quality difference is the product corresponding to each of the two evaluation production batches and the difference in historical qualified rates of the two evaluation production batches. One element in the test quality difference is the product corresponding to each of the two evaluation production batches and the difference in actual qualified rates of the two evaluation production batches. In some embodiments, the one element in the reference quality difference may also include a difference in the values of the abnormal quality indicators of the two evaluation production batches.

In some embodiments, the device management platform may calculate the mean value and the standard deviation of the deviation rate based on the plurality of deviation rates, sum up the mean value and the standard deviation to obtain a sum value, compare the sum value with a third staircase, select a staircase in the third threshold staircase that contains the sum value and determine a level corresponding to the staircase as the data anomaly degree of the target device.

In some embodiments, the third threshold staircase may be preset based on the historical experience. In some embodiments, the third threshold staircase may include a plurality of numerical intervals and corresponding levels. For example, the third staircase may be 0 to 10 corresponding to grade 1, 10 to 20 corresponding to grade 2, and 20 to 30 corresponding to grade 3, etc.

In some embodiments, the device management platform may determine a plurality of state abnormal probabilities of the target device based on the reference quality difference and the test quality difference through a failure evaluation model, and determine the data anomaly degree based on the plurality of state abnormal probabilities.

The state abnormal probability refers to a predicted probability of anomaly in the target device.

The failure evaluation model refers to a model for determining the state abnormal probability. In some embodiments, the failure evaluation model may be a machine learning model. For example, the failure evaluation model may include any one or a combination of a DNN model, a NN model, or other customized model structure, etc.

In some embodiments, an input to the failure evaluation model may include the test quality difference and the reference quality difference of any two evaluation production batches, and an output may include the state abnormal probabilities corresponding to the two evaluation production batches. The input may be repeated for various times to obtain the plurality of state abnormal probabilities.

In some embodiments, the device management platform may train the failure evaluation model based on a training sample set, e.g., by a gradient descent method. The training sample set may include a great number of second training samples with second labels, the second training sample may include a sample reference quality difference and a sample test quality difference, and the second label of the second training sample may be whether the target device shows an anomaly.

In some embodiments, the training sample set may be obtained based on the historical data. For example, the device management platform may obtain, from the historical data and under situations where the anomaly occurs and where the anomaly does not occur to the target device, the test quality difference of the two different historical production batches. The device management platform may further take the test quality difference and the reference quality difference corresponding to the two historical production patches as a pair of second training samples; set the second label of the second training sample in which the target device has the anomaly to 1, and set the second label of the second training sample in which the target device does not have the anomaly to 0. The above process is repeated to obtain a plurality of pairs of second training samples, and form the plurality of pairs of second training samples into the training sample set.

In some embodiments, a distribution density of the historical production batches making up the second training sample in the training data set may be correlated to an abnormal quality difference of the historical production batches. The device management platform may determine the distribution density of the historical production batches that forms the second training sample in the training data set based on the abnormal quality difference of the historical production batches. The smaller the abnormal quality difference, the higher the distribution density of the historical production batches. For the distribution density of the production batches, please refer to the relevant descriptions above.

The abnormal quality difference refers to the test quality difference in the situation of anomaly in the target device.

It may be understood that in the situation of anomaly in the target device, the smaller the test quality difference, the more difficult it is for the failure evaluation model to accurately output the state abnormal probability based on the test quality difference. Therefore, the historical production batches with a greater distribution density are needed to be taken as the second training sample, so that the failure evaluation model is able to fully learn rules and a more accurate failure evaluation model is obtained.

In some embodiments, the training process of the failure evaluation model is similar to the training process of the adequacy degree model, which can be found in the illustration of the training process of the adequacy degree model.

In some embodiments, the device management platform may set a learning rate for the training of the failure evaluation model based on the distribution density of the historical production batches that form the second training sample in the training sample set; the higher the distribution density of the historical production batches, the smaller the learning rate.

The learning rate refers to a loss value of the loss function at each iteration.

Understandably, with a higher learning rate, an initial failure evaluation model is updated more significantly, which is prone to a loss function oscillation, causing the initial failure evaluation model to skip the optimal solution. The second training samples with a greater distribution density may correspond to the second labels with a greater difference. At this time, the loss value may be greater, resulting in the initial failure evaluation model to have a greater update amplitude and to skip the optimal solution. Therefore, it is necessary to reduce the learning rate to improve the stability of the failure evaluation model.

In some embodiments, the device management platform may perform a weighted summation on the plurality of state abnormal probabilities to obtain a sum value, compare the sum value with a fourth staircase, select a staircase in the fourth staircase that includes the sum value, and determine the corresponding level of the staircase as the data anomaly degree of the target device.

In some embodiments, the weights in the process of weighted summation of the plurality of state abnormal probabilities may be correlated to a time difference between the two production batches corresponding to the state abnormal probabilities. The device management platform may assign greater weights to the state abnormal probabilities for which the time difference between the two production batches is smaller. The smaller the time difference between the two production batches, the closer the state of the target device when testing the two production batches, and the more meaningful the reference of the test results of the two production batches.

In some embodiments, the fourth staircase may be preset based on the historical experience. In some embodiments, the fourth stair case may include a plurality of percentage intervals and corresponding levels. For example, the percentage intervals may be 0 to 10% corresponding to level 1, 10% to 20% corresponding to level 2, and 20% to 30% corresponding to level 3, etc.

In some embodiments of the present disclosure, a correlation relationship between the reference quality difference, the test quality difference, and the state abnormal probabilities is obtained through a self-learning capability of the machine learning model, which in turn quickly determines the plurality of state abnormal probabilities of the target device, and determine, based on the plurality of state abnormal probabilities, a more accurate data anomaly degree.

In some embodiments of the present disclosure, according to the reference quality difference and the test quality difference, a more in-depth second diagnosis may be performed on the target device to determine a more accurate data anomaly degree, which in turn facilitates the subsequent accurate determination of whether to generate the anomaly warning instruction.

In some embodiments of the present disclosure, an anomaly threshold range with a high reference is constructed through the third processed data, and the data anomaly degree may be determined simply and quickly by determining the anomaly level corresponding to the operation data in the anomaly threshold range.

It should be noted that the foregoing description of the process 400 is intended to be exemplary and illustrative only and does not limit the scope of application of the present disclosure. For those skilled in the art, various corrections and changes to the process hand-eye calibration may be made under the guidance of the present disclosure. However, these corrections and changes remain within the scope of the present disclosure.

Figure 5:
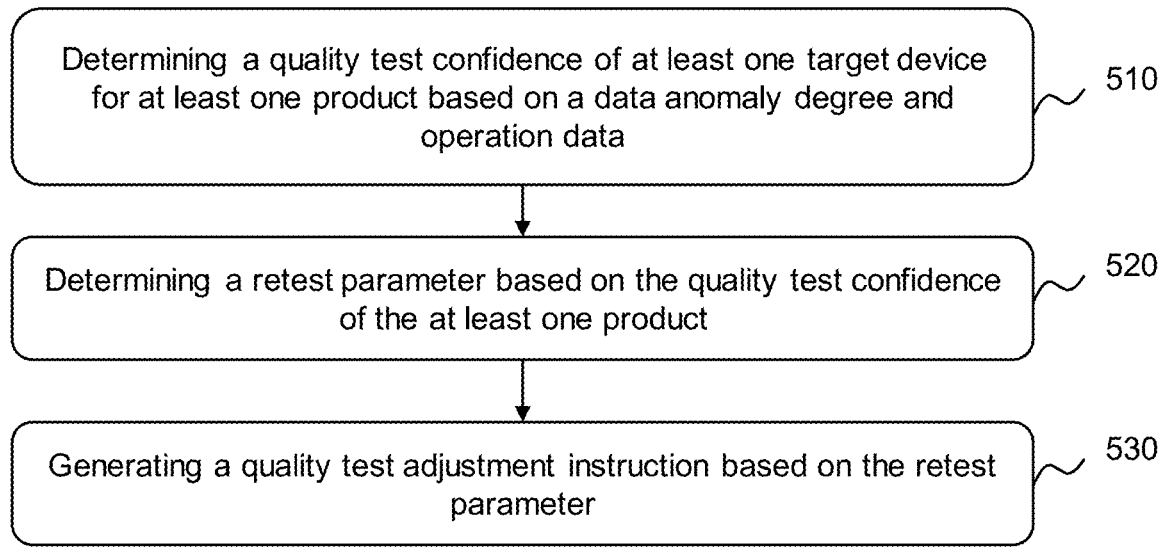
FIG. 5 is a flow chart illustrating an exemplary process for generating a quality test adjustment instruction according to some embodiments of the present disclosure.

FIG. 5 is a flow chart illustrating an exemplary process for generating a quality test adjustment instruction according to some embodiments of the present disclosure. In some embodiments, a process 500 is performed by a device management platform of a system for determining a device anomaly. As shown in FIG. 5, the process 500 includes the following steps.

In 510, determining a quality test confidence of at least one target device for at least one product based on a data anomaly degree and operation data.

The quality test confidence is used to indicate a degree of confidence of a test result of a quality test on a product performed by the target device. In some embodiments, the quality test confidence may be indicated by a numerical value, etc., and the greater the numerical value, the greater the quality test confidence.

In some embodiments, the device management platform may determine the quality test confidence of the product based on the data anomaly degree and the operation data in various ways. For example, the device management platform may select the operation data corresponding to a current product in the operation data, determine an anomaly threshold range corresponding to the operation data based on the operation data and the anomaly threshold range, and calculate a difference between the operation data and an intermediate value of the anomaly threshold range. The device management platform may determine the quality test confidence of the product based on the difference between the operation data and the intermediate value of the anomaly threshold range and the data anomaly degree through a first confidence corresponding relationship. The first confidence corresponding relationship may be preset based on historical experience. For example, the first confidence corresponding relationship may be that the greater the difference between the operation data and the intermediate value of the anomaly threshold range, the greater the data anomaly degree, the lower the quality test confidence of the product. For descriptions of the operation data, the data anomaly degree, and the anomaly threshold range, please refer to FIG. 2, FIG. 4, and their related descriptions.

In some embodiments, the device management platform may determine the quality test confidence for each product tested by the target device through the manner of determining the quality test confidence for a product described above.

In some embodiments, the device management platform may determine change data of the operation data; divide the operation data based on the change data to obtain a plurality of test stages; and, determine the quality test confidence of the product corresponding to each of the plurality of test stages based on a stage duration, the operation data, and the data anomaly degree corresponding to each of the plurality of test stages.

The change data of the operation data is used to indicate a trend in the operation data. In some embodiments, the device management platform may calculate a difference between each operation sub-data and a mean value of the operation sub-data in the operation data to obtain the change data.

The test stage refers to a segment of data in the operation data.

In some embodiments, the device management platform may sequentially divide the operation data based on the change data, select a portion of the operation data in which the change data is first consecutively lower than a standard deviation of the operation data or consecutively higher than the standard deviation of the operation data, and divide the portion of the data into a first test stage. In the operation data after the first test stage, the device management platform may select a portion of the operation data in which the change data is first continuously lower than the standard deviation of the operation data or continuously higher than the standard deviation of the operation data, and divide the portion of the plurality of operation data corresponding to the change data into a second test stage. In this way, the operation data is divided into a plurality of test stages.

In some embodiments, the device management platform may determine the quality test confidence of the product corresponding to each of the plurality of test stages based on the stage duration, the operation data, and the data anomaly degree corresponding to each of the plurality of test stages. The stage duration refers to a duration for obtaining the operation data within the test stage. In some embodiments, the device management platform may determine a ratio of a number of products within the test stage to a preset sampling rate as the stage duration corresponding to the test stage.

The second confidence corresponding relationship may be preset based on the historical experience. For example, the second confidence corresponding relationship may be that the longer the duration of the test stage, the smaller the difference between the standard deviation of the change data corresponding to the test stage and the operation data, and the lower the data anomaly degree, the higher the quality test confidence of the product.

It may be understood that during a process of the target device from normal to abnormal, a fluctuation range of the operation data may not be great in an early stage, while in a later stage, the fluctuation range of the operation data may be greater. Through the division of the test stages of the operation data, it is possible to determine the quality test confidence of the product for different test stages.

In some embodiments of the present disclosure, by dividing the operation data into the test stages and determining the quality test confidence of the product based on each test stage, a more accurate quality test confidence may be determined, and an efficiency of determining the quality test confidence may be improved.

In some embodiments, the quality test confidence may also be related to a manner of obtaining the data anomaly degree. The manner may include a first diagnosis and a second diagnosis.

In some embodiments, if the data anomaly degree is obtained from the first diagnosis, then the quality test confidence is not addressed. If the data anomaly degree is obtained from the second diagnosis, a fourth preprocessing is performed on the quality test confidence of the product corresponding to each test stage to obtain a processed quality test confidence.

In some embodiments, the fourth preprocessing may include the device management platform multiplying the quality test confidence with an insurance factor. The insurance factor is a constant less than 1. It may be understood that if the data anomaly degree is obtained from the second diagnosis, it means that the target device has a more complex anomaly, and therefore requires a lower quality test confidence.

In some embodiments, the device management platform may determine the insurance factor based on the data anomaly degree determined in the second diagnosis. For example, the device management platform may determine, based on the data anomaly degree determined in the second diagnosis, that if the data anomaly degree is equal to the anomaly threshold, the insurance factor is 1. If the data anomaly degree is greater than the anomaly threshold, the insurance factor is determined based on a magnitude of the data anomaly degree over the anomaly threshold. The greater the data anomaly degree exceeds the anomaly threshold, the smaller the insurance factor.

For example, the device management platform may set the insurance factor to be 1 when the data anomaly degree is equal to a preset anomaly threshold, and correspondingly adjust the insurance factor smaller when the state anomaly threshold exceeds the preset anomaly threshold.

In some embodiments of the present disclosure, by determining an obtaining manner of the data anomaly degree, whether or not to process the quality test confidence is selected, a more accurate quality test confidence may be obtained.

In 520, determining a retest parameter based on the quality test confidence of the at least one product.

The retest parameter refers to a working parameter for the target device to retest a product that has been tested. In some embodiments, the retest parameter may include a product to be retested and a retest rate for a tensile strength.

In some embodiments, if the quality test confidence is lower than a confidence threshold, the product needs to be retested. The confidence threshold may be preset based on the historical experience.

The retest rate for the tensile strength refers to a proportion of the products requiring the tensile strength in the product requires retest. In some embodiments, the device management platform may calculate a mean value of the quality test confidence of all the products that require quality test, and calculate a difference between the mean value and the confidence threshold, and determine the retest rate for the tensile strength based on the difference and a corresponding relationship between the retest rate and the difference. The corresponding relationship between the difference and the retest rate may include that when the difference value between the mean value and the confidence threshold is 0, the retest rate is the same as a preset retest rate; when the difference between the mean value and the confidence threshold is greater than 0 and the greater the difference value, the greater an increase of the retest rate on a basis of the preset retest rate.

In 530, generating a quality test adjustment instruction based on the retest parameter.

The quality test adjustment instruction refers to an instruction to adjust a deliver device that delivers the product to the target device. The deliver device may include a deliver belt that delivers the product. In some embodiments, the deliver device corresponds to one or more target devices.

In some embodiments, the quality test adjustment instruction may include a target deliver belt, a deliver speed.

The target deliver belt refers to a deliver belt that delivers the product that needs to be retested. The deliver speed refers to a speed of each deliver. As an abnormal device needs to be manually overhauled, resulting in the products that need to be tested by the abnormal device needing to be tested by the other target device, the device management platform adjusts the products that need to be retested to be transported on the target deliver belt to the other target device. At the same time, the speed of each deliver belt needs to be slowed down to cooperate with a robotic arm and other device to move the product from one deliver belt to the target deliver belt.

In some embodiments, through a load of each deliver belt obtained by the management data center, the device management platform may select the deliver belt with the lowest load as the target deliver belt and generate the quality test adjustment instruction based on the target deliver belt and the deliver speed. The deliver speed may be preset based on the historical experience. The load of the deliver belt refers to current plurality of products remaining on the deliver belt that require quality test.

In some embodiments, the device management platform may send the quality test adjustment instruction to a device perceptual control platform through a device sensor network platform to control the device, such as the robotic arm, to dispatch the current remaining products of the abnormal device that require quality test and the products that require retest to the target deliver belt.

In some embodiments of the present disclosure, the quality test adjustment instruction may be sent to adjust the products that need to be tested subsequently by the abnormal device to other target device for test to ensure that the test results of the products are accurate, and at the same time, the deliver speed of the deliver belt is adjusted to ensure that the products are smoothly dispatched to the target deliver.

It should be noted that the foregoing description of the process 500 is intended to be exemplary and illustrative only and does not limit the scope of application of the present disclosure. For those skilled in the art, various corrections and changes to the process hand-eye calibration may be made under the guidance of the present disclosure. However, these corrections and changes remain within the scope of the present disclosure.

Some embodiments of the present disclosure further provide a computer-readable storage medium, the storage medium storing computer instructions, and when the computer reads the computer instructions in the storage medium, the computer executes the method for determining a device anomaly based on an industrial IoT according to any one of the above embodiments.

In some embodiments, the device management platform may construct a knowledge graph of the device anomaly, analyze types of the device anomalies based on a device anomaly diagnostic and processing model, and output an anomaly processing plan. The device anomaly diagnosis and processing model may be a machine learning model. The anomaly handling plan may include repair steps, required tools or parts, an estimated repair time, and recommended personnel for repair.

In some embodiments, the device management platform may label textual data such as the operation data, the type of anomaly, a repair record, and repair measures, and identify data labels related to the device anomaly from the textual data based on a natural language processing (NLP) technology. The device management platform may extract a relationship between each data label and establish mapping through preset rules to form a network structure of the knowledge graph and store the constructed knowledge graph of device anomalies in the management data center in order to provide a query of the system for determining a device anomaly.

By constructing the knowledge graph of device failures, the system for determining a device anomaly may quickly retrieve information such as a historical repair record and repair measures related to the current failure type and provide accurate troubleshooting solutions for the repairing personnel. This greatly reduces a time spent on troubleshooting and repairing and improves an efficiency of troubleshooting.

The construction process of the device failure knowledge graph utilizes the NLP technology, which is able to automatically identify data labels related to the device failures from the textual data and establish mappings by extracting the relationship between each data label through the preset rules. This intelligent application makes the construction of the knowledge graph more efficient and accurate and provides a strong support for subsequent troubleshooting.

The data-driven approach realizes a prediction, an early warning, and a treatment of the device failures, and improves the intelligence of the system for determining a device anomaly. Through continuous learning and optimization, the system is able to more accurately identify the types of failures, output troubleshooting solutions, and provide more professional guidance to the repairing personnel.

Through timely and accurate failure warning and troubleshooting, the system for determining a device anomaly is able to minimize an impact of device failures on the production operation, and to reduce a downtime and a production loss due to the failures. At the same time, through intelligent troubleshooting solutions, an unnecessary repair work and a waste of resources are reduced, thus reducing a repairing cost.

In addition, certain features, structures, or characteristics of one or more embodiments of the present disclosure may be suitably combined.

Some embodiments use numbers to describe the plurality of components, attributes, and it should be understood that such numbers used in the description of embodiments are modified in some examples by the modifiers "approximately," "nearly," or "substantially." Unless otherwise noted, the terms "about," "approximately," or "substantially" indicate that a ±20% variation in the stated number is allowed. Correspondingly, in some embodiments, the numerical parameters used in the present disclosure and claims are approximations, which can change depending on the desired characteristics of individual embodiments. In some embodiments, the numerical parameters should take into account the specified plurality of valid digits and employ general place-keeping. While the numerical domains and parameters used to confirm the breadth of their ranges according to some embodiments of the present disclosure are approximations, in specific embodiments such values are set to be as precise as practicable.

In the event of any inconsistency or conflict between the descriptions, definitions, and/or use of terminology in the materials cited in the present disclosure and those described in the present disclosure, the descriptions, definitions, and/or use of terminology in the present disclosure shall prevail.

What is claimed is:

1. A method for determining a device anomaly based on an industrial Internet of things (IoT), wherein the method is executed by a device management platform of a system for determining the device anomaly based on the industrial IoT, the device management platform includes a device management sub-platform and a management data center, and the method comprises:
    generating a data collection instruction based on a preset sampling rate through the device management sub-platform and sending the data collection instruction to the management data center;
    obtaining, based on the data collection instruction, operation data of at least one target device from a sensor general database in a device sensor network platform through the management data center, and partitioning and storing the operation data based on a data source identification, the operation data being obtained by the device sensor network platform through a device perceptual control platform;
    determining a data anomaly degree for the at least one target device based on the operation data;
    in response to determining that the data anomaly degree satisfies a preset condition, determining an abnormal device based on the data source identification of the operation data;
    generating an anomaly warning instruction based on the abnormal device and the data anomaly degree corresponding to the abnormal device;
    generating a sampling adjustment instruction based on the data anomaly degree and sending the sampling adjustment instruction to the device sensor network platform to adjust the preset sampling rate at which the device sensor network platform obtains the operation data of the abnormal device through the device perceptual control platform, including:
        generating at least one candidate sampling rate based on the preset sampling rate and the data anomaly degree;
        evaluating a sampling adequacy degree of the at least one candidate sampling rate based on the at least one candidate sampling rate, the data anomaly degree, a data feature of the operation data, and environmental information through an adequacy degree model, the adequacy degree model being a machine learning model; and
        determining a target sampling rate based on the sampling adequacy degree and the at least one candidate sampling rate, and sending the sampling adjustment instruction to the device sensor network platform based on the target sampling rate; and
    generating a storage adjustment instruction based on the data anomaly degree and sending the storage adjustment instruction to the management data center to adjust a size of a storage partition corresponding to the abnormal device in the management data center.

2. The method of claim 1, wherein the device sensor network platform includes the sensor general database, a sensor network sub-platform, and a sensor sub-database, and the obtaining, based on the data collection instruction, the operation data of the at least one target device from the sensor general database in the device sensor network platform through the management data center includes:
    obtaining the operation data from the sensor sub-database through a device perceptual control sub-platform and sending the operation data to the sensor network sub-platform corresponding to the sensor sub-database;
    performing a first preprocessing on the obtained operation data through the sensor network sub-platform, obtaining first processed data and storing the first processed data in the sensor sub-database;
    obtaining the first processed data from the sensor general database through the sensor sub-database, and performing a second preprocessing on the first processed data to obtain second processed data, and sending the second processed data to the management data center; and
    creating, through the management data center, a partition index corresponding to the second processed data, and storing the second processed data in a partition corresponding to the partition index.

3. The method of claim 1, wherein determining the data anomaly degree for the at least one target device based on the operation data includes:

obtaining historical operation data of the at least one target device and performing a third preprocessing on the historical operation data to obtain third processed data;

determining the data feature of the third processed data based on the third processed data;

determining an anomaly threshold range based on the data feature of the third processed data, the anomaly threshold range includes a plurality of anomaly levels and a threshold range corresponding to each of the plurality of anomaly levels; and determining the data anomaly degree based on the operation data and the anomaly threshold range.

4. The method of claim 3, wherein the operation data includes a test result, the determining the data anomaly degree based on the operation data and the anomaly threshold range includes:

in response to determining that the test result satisfies a first diagnosis condition, performing a first diagnosis on the target device, wherein the first diagnosis includes:

generating a first diagnostic instruction based on the operation data and the anomaly threshold range, and sending the first diagnostic instruction to the device perceptual control platform through the device sensor network platform to control a diagnostic device of the device perceptual control platform to deliver a diagnostic sample to the target device; and determining the data anomaly degree based on a first diagnostic result obtained by a quality test on the diagnostic sample by the target device.

5. The method of claim 4, wherein the determining the data anomaly degree based on a first diagnostic result obtained by a quality test on the diagnostic sample by the target device includes:

in response to determining that the first diagnostic result satisfies a second diagnosis condition, performing a second diagnosis on the target device, wherein the second diagnosis includes:

obtaining a production similarity degree of production information of a plurality of production batches, and determining an evaluation production batch based on the production similarity degree;

determining a reference quality difference based on evaluation production information of the evaluation production batch; and determining the data anomaly degree based on the reference quality difference and a test quality difference, the test quality difference being obtained by performing a quality test on each product of the plurality of production batches by the target device.

6. The method of claim 1, wherein the method further includes:

determining a quality test confidence of the at least one target device for at least one product based on the data anomaly degree and the operation data;

determining a retest parameter based on the quality test confidence of the at least one product; and generating a quality test adjustment instruction based on the retest parameter.

7. A system for determining a device anomaly based on an industrial Internet of things (IoT), wherein the system includes a user platform, a service platform, a device management platform, a device sensor network platform, and a device perceptual control platform, the device management platform includes a device management sub-platform and a management data center, and the device management platform is configured to:

generate a data collection instruction based on a preset sampling rate through the device management sub-platform and send the data collection instruction to the management data center;

obtain, based on the data collection instruction, operation data of at least one target device from a sensor general database in a device sensor network platform through the management data center, and partition and store the operation data based on a data source identification, the operation data being obtained by the device sensor network platform through a device perceptual control platform;

determine a data anomaly degree for the at least one target device based on the operation data;

in response to determining that the data anomaly degree satisfies a preset condition, determine an abnormal device based on the data source identification of the operation data;

generate an anomaly warning instruction based on the abnormal device and the data anomaly degree corresponding to the abnormal device;

generate a sampling adjustment instruction based on the data anomaly degree and send the sampling adjustment instruction to the device sensor network platform to adjust the preset sampling rate at which the device sensor network platform obtains the operation data of the abnormal device through the device perceptual control platform, including:

generating at least one candidate sampling rate based on the preset sampling rate and the data anomaly degree;

evaluating a sampling adequacy degree of the at least one candidate sampling rate based on the at least one candidate sampling rate, the data anomaly degree, a data feature of the operation data, and environmental information through an adequacy degree model, the adequacy degree model being a machine learning model; and determining a target sampling rate based on the sampling adequacy degree and the at least one candidate sampling rate, and sending the sampling adjustment instruction to the device sensor network platform based on the target sampling rate; and generate a storage adjustment instruction based on the data anomaly degree and send the storage adjustment instruction to the management data center to adjust a size of a storage partition corresponding to the abnormal device in the management data center.

8. The system of claim 7, wherein the device management platform is further configured to:

obtain the operation data from the sensor sub-database through a device perceptual control sub-platform and sending the operation data to the sensor network sub-platform corresponding to the sensor sub-database;

perform a first preprocessing on the obtained operation data through the sensor network sub-platform, obtaining first processed data and storing the first processed data in the sensor sub-database;

obtain the first processed data from the sensor general database through the sensor sub-database, and perform a second preprocessing on the first processed data to obtain second processed data, and send the second processed data to the management data center; and create, through the management data center, a partition index corresponding to the second processed data, and store the second processed data in a partition corresponding to the partition index.

9. The system of claim 7, wherein the device management platform is further configured to:
obtain a historical operation data of the at least one target device and perform a third preprocessing on the historical operation data to obtain a third processed data;
determine the data feature of the third processed data based on the third processed data;
determine an anomaly threshold range based on the data feature of the third processed data, the anomaly threshold range includes a plurality of anomaly levels and a threshold range corresponding to each of the plurality of anomaly levels; and
determine the data anomaly degree based on the operation data and the anomaly threshold range.

10. The system of claim 7, wherein the device management platform is further configured to:
determine a quality test confidence of the at least one target device for at least one product based on the data anomaly degree and the operation data;
determine a retest parameter based on the quality test confidence of the at least one product; and
generate a quality test adjustment instruction based on the retest parameter.

11. A non-transitory computer-readable storage medium, wherein the storage medium stores computer instructions, and when a computer reads the computer instructions in the storage medium, the computer executes a method for determining a device anomaly based on an industrial Internet of things (IoT), and the method comprises:
generating a data collection instruction based on a preset sampling rate through a device management sub-platform and sending the data collection instruction to a management data center;
obtaining, based on the data collection instruction, operation data of at least one target device from a sensor general database in a device sensor network platform through the management data center, and partitioning and storing the operation data based on a data source identification, the operation data being obtained by the device sensor network platform through a device perceptual control platform;
determining a data anomaly degree for the at least one target device based on the operation data;
in response to determining that the data anomaly degree satisfies a preset condition, determining an abnormal device based on the data source identification of the operation data;
generating an anomaly warning instruction based on the abnormal device and the data anomaly degree corresponding to the abnormal device;
generating a sampling adjustment instruction based on the data anomaly degree and sending the sampling adjustment instruction to the device sensor network platform to adjust the preset sampling rate at which the device sensor network platform obtains the operation data of the abnormal device through the device perceptual control platform, including:
generating at least one candidate sampling rate based on the preset sampling rate and the data anomaly degree;
evaluating a sampling adequacy degree of the at least one candidate sampling rate based on the at least one candidate sampling rate, the data anomaly degree, a data feature of the operation data, and environmental information through an adequacy degree model, the adequacy degree model being a machine learning model; and
determining a target sampling rate based on the sampling adequacy degree and the at least one candidate sampling rate, and sending the sampling adjustment instruction to the device sensor network platform based on the target sampling rate; and
generating a storage adjustment instruction based on the data anomaly degree and sending the storage adjustment instruction to the management data center to adjust a size of a storage partition corresponding to the abnormal device in the management data center.

* * * * *